(12) United States Patent
Kumar et al.

(10) Patent No.: US 12,501,313 B2
(45) Date of Patent: Dec. 16, 2025

(54) COMPRESSION TECHNIQUES FOR DATA AND REFERENCE SIGNAL RESOURCE ELEMENTS (REs)

(71) Applicant: QUALCOMM Incorporated, San Diego, CA (US)

(72) Inventors: Satish Kumar, Hyderabad (IN); Tushar Singh, Hyderabad (IN); Sarath Pinayour Chandrasekaran, Hyderabad (IN); Loksiva Paruchuri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 18/000,255

(22) PCT Filed: Jul. 9, 2021

(86) PCT No.: PCT/US2021/041135
§ 371 (c)(1),
(2) Date: Nov. 29, 2022

(87) PCT Pub. No.: WO2022/015598
PCT Pub. Date: Jan. 20, 2022

(65) Prior Publication Data
US 2023/0199557 A1 Jun. 22, 2023

(30) Foreign Application Priority Data
Jul. 16, 2020 (IN) .............................. 202041030351

(51) Int. Cl.
*H04W 28/06* (2009.01)
*H03M 7/30* (2006.01)
*H04W 8/22* (2009.01)

(52) U.S. Cl.
CPC ......... *H04W 28/06* (2013.01); *H03M 7/6011* (2013.01); *H03M 7/607* (2013.01); *H04W 8/22* (2013.01)

(58) Field of Classification Search
None
See application file for complete search history.

(56) References Cited

U.S. PATENT DOCUMENTS 9,390,752 B1 * 7/2016 McNeill ............... G11B 27/022
10,691,340 B2 * 6/2020 Ki ....................... G06F 12/1018
(Continued)

FOREIGN PATENT DOCUMENTS

KR 20200005365 A 1/2020
WO WO-2009019168 A1 * 2/2009 ........... H04L 12/437
(Continued)

OTHER PUBLICATIONS

International Search Report and Written Opinion—PCT/US2021/041135—ISA/EPO—Oct. 15, 2021.

*Primary Examiner* — Wutchung Chu
*Assistant Examiner* — Berhanu D Belete
(74) *Attorney, Agent, or Firm* — Paul M. McAdams; Patterson & Sheridan LLP

(57) ABSTRACT

Aspects of the present disclosure relate to techniques for signal compression. Certain aspects described in this disclosure can be implemented in a method for wireless communication by a distributed unit (DU). The method generally includes compressing at least one reference signal (RS) in one or more first set of resource elements (REs) of a symbol and data in one or more second set of REs of the symbol, wherein the at least one RS is compressed using a first compression type and the data is compressed using a second compression type, and wherein the first compression type is different than the second compression type; and sending, to a radio unit (RU), the symbol having the at least one RS in (Continued)

the one or more first set of REs and the data in the one or more second set of REs compressed using the first and second compression types, respectively.

30 Claims, 12 Drawing Sheets

(56) References Cited

U.S. PATENT DOCUMENTS

| | | | |
|---|---|---|---|
| 10,718,341 B2* | 7/2020 | Cortinovis | F04D 29/665 |
| 2007/0168198 A1* | 7/2007 | Chang | H03M 7/30 |
| | | | 375/E7.134 |
| 2016/0182690 A1* | 6/2016 | Akhter | H04L 69/22 |
| | | | 370/477 |
| 2016/0337255 A1* | 11/2016 | Balasubramanian | H04L 47/38 |
| 2018/0287673 A1* | 10/2018 | Chang | H04L 25/0224 |
| 2019/0044588 A1* | 2/2019 | Hong | H04L 5/0048 |
| 2019/0052420 A1* | 2/2019 | Manolakos | H04L 5/0051 |
| 2020/0052746 A1* | 2/2020 | Nammi | H04B 7/0417 |
| 2020/0186206 A1* | 6/2020 | Estella Aguerri | H04B 7/0413 |
| 2020/0186207 A1* | 6/2020 | Davydov | H04B 7/0658 |
| 2020/0220586 A1* | 7/2020 | Chopra | H04L 25/00 |
| 2020/0340704 A1* | 10/2020 | Ross | F24F 11/30 |
| 2021/0352526 A1* | 11/2021 | Kim | H04L 69/04 |
| 2022/0124542 A1* | 4/2022 | Li | H04W 88/085 |
| 2022/0414078 A1* | 12/2022 | Junker | H03M 7/6064 |

FOREIGN PATENT DOCUMENTS

| | | | |
|---|---|---|---|
| WO | 2016039839 A1 | 3/2016 | |
| WO | 2019217391 A1 | 11/2019 | |

\* cited by examiner

500

505

RECEIVE, BY A REMOTE RADIO UNIT (RU), FROM A DISTRIBUTED UNIT (DU), A SYMBOL HAVING AT LEAST ONE REFERENCE SIGNAL (RS) IN THE ONE OR MORE FIRST SET OF RESOURCE ELEMENTS (REs) COMPRESSED USING A FIRST COMPRESSION TYPE AND DATA IN THE ONE OR MORE SECOND SET OF REs COMPRESSED USING A SECOND COMPRESSION TYPE

510

DECOMPRESS, BY THE REMOTE RU, THE AT LEAST ONE RS IN THE ONE OR MORE FIRST SET OF REs OF THE SYMBOL IN ACCORDANCE WITH THE FIRST COMPRESSION TYPE AND THE DATA IN THE ONE OR MORE SECOND SET OF REs OF THE SYMBOL IN ACCORDANCE WITH THE SECOND COMPRESSION TYPE

COMPRESS, BY A DISTRIBUTED UNIT (DU), AT LEAST ONE REFERENCE SIGNAL (RS) IN ONE OR MORE FIRST SET OF RESOURCE ELEMENTS (REs) OF A SYMBOL AND DATA IN ONE OR MORE SECOND SET OF REs OF THE SYMBOL, WHEREIN THE AT LEAST ONE RS IS COMPRESSED USING A FIRST COMPRESSION TYPE AND THE DATA IS COMPRESSED USING A SECOND COMPRESSION TYPE, AND WHEREIN THE FIRST COMPRESSION TYPE IS DIFFERENT THAN THE SECOND COMPRESSION TYPE

610

SEND, BY THE DU, TO A REMOTE RADIO UNIT (RU), THE SYMBOL HAVING THE AT LEAST ONE RS IN THE ONE OR MORE FIRST SET OF RES COMPRESSED USING THE FIRST COMPRESSION TYPE AND THE DATA IN THE ONE OR MORE SECOND SET OF RES COMPRESSED USING THE SECOND COMPRESSION TYPE

APPLY DIFFERENT COMPRESSION TYPES FOR SUBSETS OF RESOURCE ELEMENTS (RES) IN A SYMBOL, WHEREIN THE SUBSETS OF RES ARE ASSOCIATED WITH THE SAME SECTION IDENTIFIER (ID), THE SECTION ID CORRESPONDING TO A SECTION OF A RESOURCE BLOCK (RB) HAVING AT LEAST THE SYMBOL

710

COMMUNICATE THE SYMBOL BETWEEN A REMOTE RADIO UNIT (RU) AND A DISTRIBUTED UNIT (DU) USING THE DIFFERENT COMPRESSION TYPES

FIG. 7

COMPRESSION TECHNIQUES FOR DATA AND REFERENCE SIGNAL RESOURCE ELEMENTS (REs)

CROSS-REFERENCE TO RELATED APPLICATION(S)

This Application is a national stage application under 35 U.S.C. 371 of PCT/US2021/041135, filed Jul. 9, 2021, which claims benefit of and priority to India Provisional Application No. 202041030351, filed Jul. 16, 2020, which are assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for signal compression.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved compression techniques.

Certain aspects of the subject matter described in this disclosure can be implemented in a method for wireless communication by a remote radio unit (RU). The method generally includes receiving, from a distributed unit (DU), a symbol having at least one reference signal (RS) in one or more first set of resource elements (REs) compressed using a first compression type and data in one or more second set of REs compressed using a second compression type; and decompressing the at least one RS in the one or more first set of REs of the symbol in accordance with the first compression type and the data in the one or more second set of REs of the symbol in accordance with the second compression type.

Certain aspects of the subject matter described in this disclosure can be implemented in a method for wireless communication by a remote RU. The method generally includes determining a first compression type for compression of at least one RS in one or more first REs of a symbol and a second compression type for compression of data in one or more second REs of the symbol; and communicating, with a DU, the symbol having the one or more first REs and the one or more second REs.

Certain aspects of the subject matter described in this disclosure can be implemented in a method for wireless communication by a DU. The method generally includes compressing at least one RS in one or more first set of REs of a symbol and data in one or more second set of REs of the symbol, wherein the at least one RS is compressed using a first compression type and the data is compressed using a second compression type, and wherein the first compression type is different than the second compression type; and sending, to a remote RU, the symbol having the at least one RS in the one or more first set of REs compressed using the first compression type and the data in the one or more second set of REs compressed using the second compression type.

Certain aspects of the subject matter described in this disclosure can be implemented in a method for wireless communication by a DU. The method generally includes determining a first compression type for compression of at least one RS in one or more first set of REs of a symbol and a second compression type for compression of data in one or more second set of REs of the symbol; and communicating, with a remote RU, the symbol having the one or more first REs and the one or more second REs.

Certain aspects of the subject matter described in this disclosure can be implemented in a method for wireless communication. The method generally includes: applying different compression types for subsets of REs in a symbol, wherein the subsets of REs are associated with the same section identifier (ID), the section ID corresponding to a section of a resource block (RB) having at least the symbol and communicating the symbol between a remote RU and a DU using the different compression types.

Certain aspects of the subject matter described in this disclosure can be implemented in a method for wireless communication. The method generally includes: applying different compression techniques for subsets of REs in a symbol, wherein the subsets of REs are associated with different RE masks, and wherein the subsets of REs are associated with the same section identifier (ID), the section ID corresponding to a section of a resource block having the symbol; and communicating the symbol between a remote RU and a DU using the different compression techniques.

Certain aspects of the subject matter described in this disclosure can be implemented in an apparatus for wireless communication by an RU, comprising: a memory; and one or more processors coupled to the memory, the memory and the one or more processors being configured to: receive, from a DU, a symbol having at least one RS in one or more first set of REs compressed using a first compression type and data in one or more second set of REs compressed using a second compression type; and decompress the at least one RS in the one or more first set of REs of the symbol in accordance with the first compression type and the data in the one or more second set of REs of the symbol in accordance with the second compression type.

Certain aspects of the subject matter described in this disclosure can be implemented in an apparatus for wireless communication by an RU, comprising: a memory; and one or more processors coupled to the memory, the memory and the one or more processors being configured to: determine a first compression type for compression of at least one RS in one or more first REs of a symbol and a second compression type for compression of data in one or more second REs of the symbol; and communicate, with DU, the symbol having the one or more first REs and the one or more second REs.

Certain aspects of the subject matter described in this disclosure can be implemented in an apparatus for wireless communication by a DU, comprising: a memory; and one or more processors coupled to the memory, the memory and the one or more processors being configured to: compress at least one RS in one or more first set of REs of a symbol and data in one or more second set of REs of the symbol, wherein the at least one RS is compressed using a first compression type and the data is compressed using a second compression type, and wherein the first compression type is different than the second compression type; and send, to a remote RU, the symbol having the at least one RS in the one or more first set of REs compressed using the first compression type and the data in the one or more second set of REs compressed using the second compression type.

Certain aspects of the subject matter described in this disclosure can be implemented in an apparatus for wireless communication by an RU, comprising: a memory; and one or more processors coupled to the memory, the memory and the one or more processors being configured to: determine a first compression type for compression of at least one RS in one or more first set of REs of a symbol and a second compression type for compression of data in one or more second set of REs of the symbol; and communicate, with a remote RU, the symbol having the one or more first REs and the one or more second REs.

Certain aspects of the subject matter described in this disclosure can be implemented in an apparatus for wireless communication, comprising: a memory; and one or more processors coupled to the memory, the memory and the one or more processors being configured to: apply different compression types for subsets of REs in a symbol, wherein the subsets of REs are associated with the same section ID, the section ID corresponding to a section of a RB having at least the symbol and communicate the symbol between a remote RU and a DU using the different compression types.

Certain aspects of the subject matter described in this disclosure can be implemented in an apparatus for wireless communication, comprising: a memory; and one or more processors coupled to the memory, the memory and the one or more processors being configured to: apply different compression techniques for subsets of REs in a symbol, wherein the subsets of REs are associated with different RE masks, and wherein the subsets of REs are associated with the same section ID, the section ID corresponding to a section of a resource block having the symbol; and communicating the symbol between a remote RU and a DU using the different compression techniques.

Certain aspects of the subject matter described in this disclosure can be implemented in an apparatus for wireless communication by an RU, comprising: means for receiving, from a DU, a symbol having at least one RS in one or more first set of REs compressed using a first compression type and data in one or more second set of REs compressed using a second compression type; and means for decompressing the at least one RS in the one or more first set of REs of the symbol in accordance with the first compression type and the data in the one or more second set of REs of the symbol in accordance with the second compression type.

Certain aspects of the subject matter described in this disclosure can be implemented in an apparatus for wireless communication by an RU, comprising: means for determining a first compression type for compression of at least one RS in one or more first REs of a symbol and a second compression type for compression of data in one or more second REs of the symbol; and means for communicating, with DU, the symbol having the one or more first REs and the one or more second REs.

Certain aspects of the subject matter described in this disclosure can be implemented in an apparatus for wireless communication by a DU, comprising: means for compressing at least one RS in one or more first set of REs of a symbol and data in one or more second set of REs of the symbol, wherein the at least one RS is compressed using a first compression type and the data is compressed using a second compression type, and wherein the first compression type is different than the second compression type; and means for sending, to a remote RU, the symbol having the at least one RS in the one or more first set of REs compressed using the first compression type and the data in the one or more second set of REs compressed using the second compression type.

Certain aspects of the subject matter described in this disclosure can be implemented in an apparatus for wireless communication by a DU, comprising: means for determining a first compression type for compression of at least one RS in one or more first set of REs of a symbol and a second compression type for compression of data in one or more second set of REs of the symbol; and means for communicating, with a remote RU, the symbol having the one or more first REs and the one or more second REs.

Certain aspects of the subject matter described in this disclosure can be implemented in an apparatus for wireless communication, comprising: means for applying different compression types for subsets of REs in a symbol, wherein the subsets of REs are associated with the same section ID, the section ID corresponding to a section of a RB having at least the symbol and means for communicating the symbol between a remote RU and a DU using the different compression types.

Certain aspects of the subject matter described in this disclosure can be implemented in an apparatus for wireless communication, comprising: means for applying different compression techniques for subsets of REs in a symbol, wherein the subsets of REs are associated with different RE masks, and wherein the subsets of REs are associated with the same section ID, the section ID corresponding to a section of a resource block having the symbol; and means for communicating the symbol between a RU and a DU using the different compression techniques.

Certain aspects of the subject matter described in this disclosure can be implemented in a computer-readable medium having instructions stored thereon to cause one or more processors to: receive, from a DU, a symbol having at least one RS in one or more first set of REs compressed using a first compression type and data in one or more second set of REs compressed using a second compression type; and decompress the at least one RS in the one or more first set of REs of the symbol in accordance with the first compression type and the data in the one or more second set of REs of the symbol in accordance with the second compression type.

Certain aspects of the subject matter described in this disclosure can be implemented in a computer-readable medium having instructions stored thereon to cause one or more processors to: determine a first compression type for compression of at least one RS in one or more first REs of a symbol and a second compression type for compression of data in one or more second REs of the symbol; and communicate, with DU, the symbol having the one or more first REs and the one or more second REs.

Certain aspects of the subject matter described in this disclosure can be implemented in a computer-readable medium having instructions stored thereon to cause one or more processors to: compress at least one RS in one or more first set of REs of a symbol and data in one or more second set of REs of the symbol, wherein the at least one RS is compressed using a first compression type and the data is compressed using a second compression type, and wherein the first compression type is different than the second compression type; and send, to a remote RU, the symbol having the at least one RS in the one or more first set of REs compressed using the first compression type and the data in the one or more second set of REs compressed using the second compression type.

Certain aspects of the subject matter described in this disclosure can be implemented in a computer-readable medium having instructions stored thereon to cause one or more processors to: determine a first compression type for compression of at least one RS in one or more first set of REs of a symbol and a second compression type for compression of data in one or more second set of REs of the symbol; and communicate, with a remote RU, the symbol having the one or more first REs and the one or more second REs.

Certain aspects of the subject matter described in this disclosure can be implemented in a computer-readable medium having instructions stored thereon to cause one or more processors to: apply different compression types for subsets of REs in a symbol, wherein the subsets of REs are associated with the same section ID, the section ID corresponding to a section of a RB having at least the symbol and communicate the symbol between a remote RU and a DU using the different compression types.

Certain aspects of the subject matter described in this disclosure can be implemented in a computer-readable medium having instructions stored thereon to cause one or more processors to: apply different compression techniques for subsets of REs in a symbol, wherein the subsets of REs are associated with different RE masks, and wherein the subsets of REs are associated with the same section ID, the section ID corresponding to a section of a resource block having the symbol; and communicating the symbol between a remote RU and a DU) using the different compression techniques.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 is a flow diagram illustrating example operations for wireless communication by a receiver node, in accordance with certain aspects of the present disclosure.

FIG. 6 is a flow diagram illustrating example operations for wireless communication by a network node, in accordance with certain aspects of the present disclosure.

FIG. 7 is a flow diagram illustrating example operations for wireless communication, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
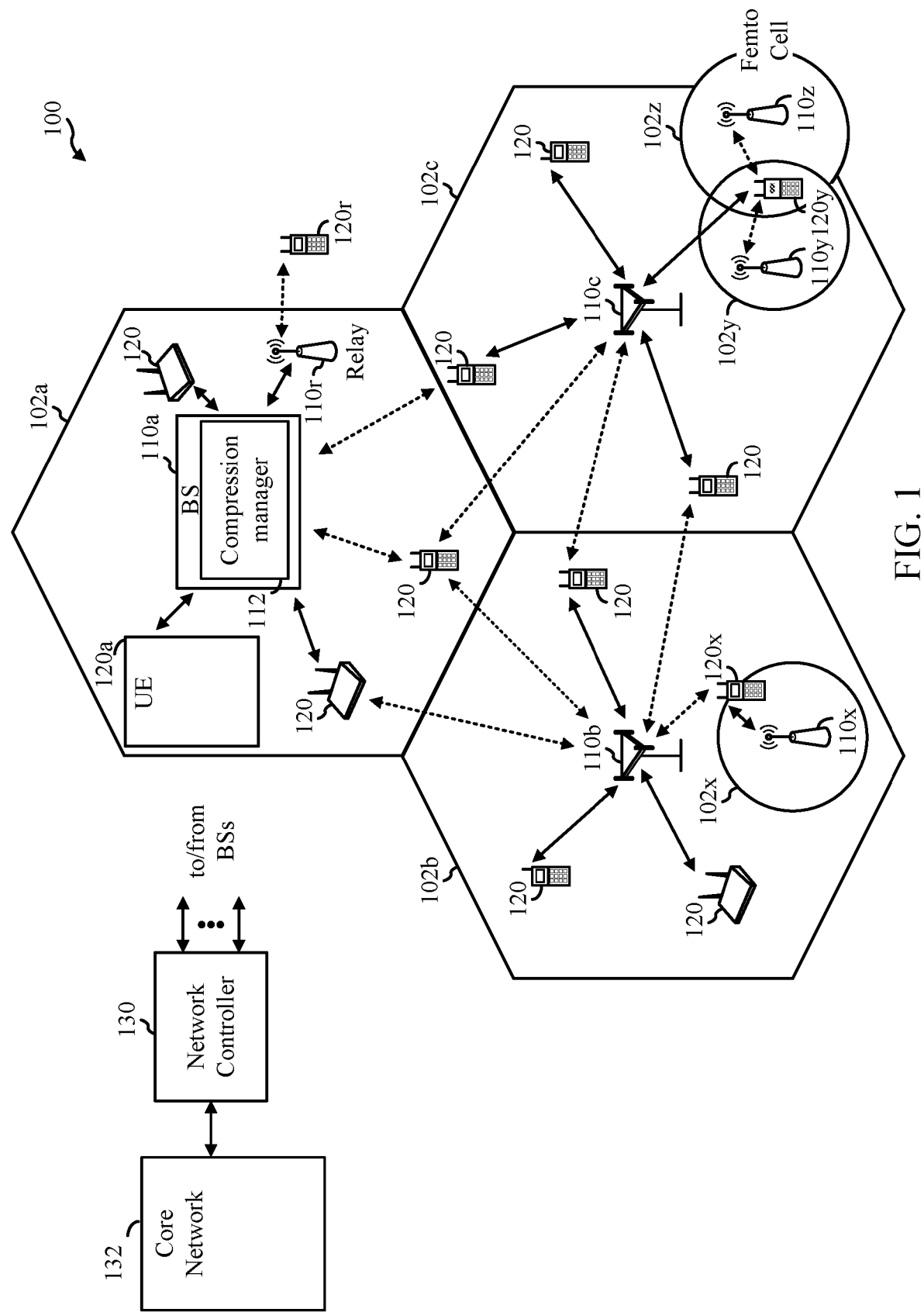
FIG. 1 is a block diagram conceptually illustrating an example telecommunications system, in accordance with certain aspects of the present disclosure.

Certain aspects of the present disclosure provide apparatus, methods, processing systems, and computer readable mediums for reference signal (RS) and data compression.

For example, certain aspects provide flexibility in using different compression techniques (also referred to herein as compression types) for RS resource elements (REs) and data REs configured in the same symbol.

In open-radio access network (O-RAN), if a symbol carries both RS and data REs, conventional implementations may apply the same compression type to both RS and data REs within a physical resource block (PRB). However, applying the same compression type to RS and data REs may result in usage of relatively lossy compression for the RS REs. The aspects described herein provide flexibility to use different compression types for data and RS REs such that RSs may be protected with a more robust and less lossy compression type without compromising on compression for data REs. Using a more effective compression technique for RS REs reduces signaling overhead and front-haul bandwidth.

The following description provides examples of compression techniques in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 megahertz (MHz) or beyond), millimeter wave (mmW) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more base station (BSs) 110 and/or user equipment (UE) 120 in the wireless communication network 100 via one or more interfaces.

As illustrated in FIG. 1, the wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. A network controller 130 may couple to a set of BSs 110 and provide coordination and control for these BSs 110 (e.g., via a backhaul).

The BSs 110 communicate with UEs 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for RS and data compression. As shown in FIG. 1, the BS 110*a* includes a compression manager 112. The compression manager 112 may be configured to process RS and data REs in the same symbol based on different compression types, in accordance with aspects of the present disclosure.

Figure 2:
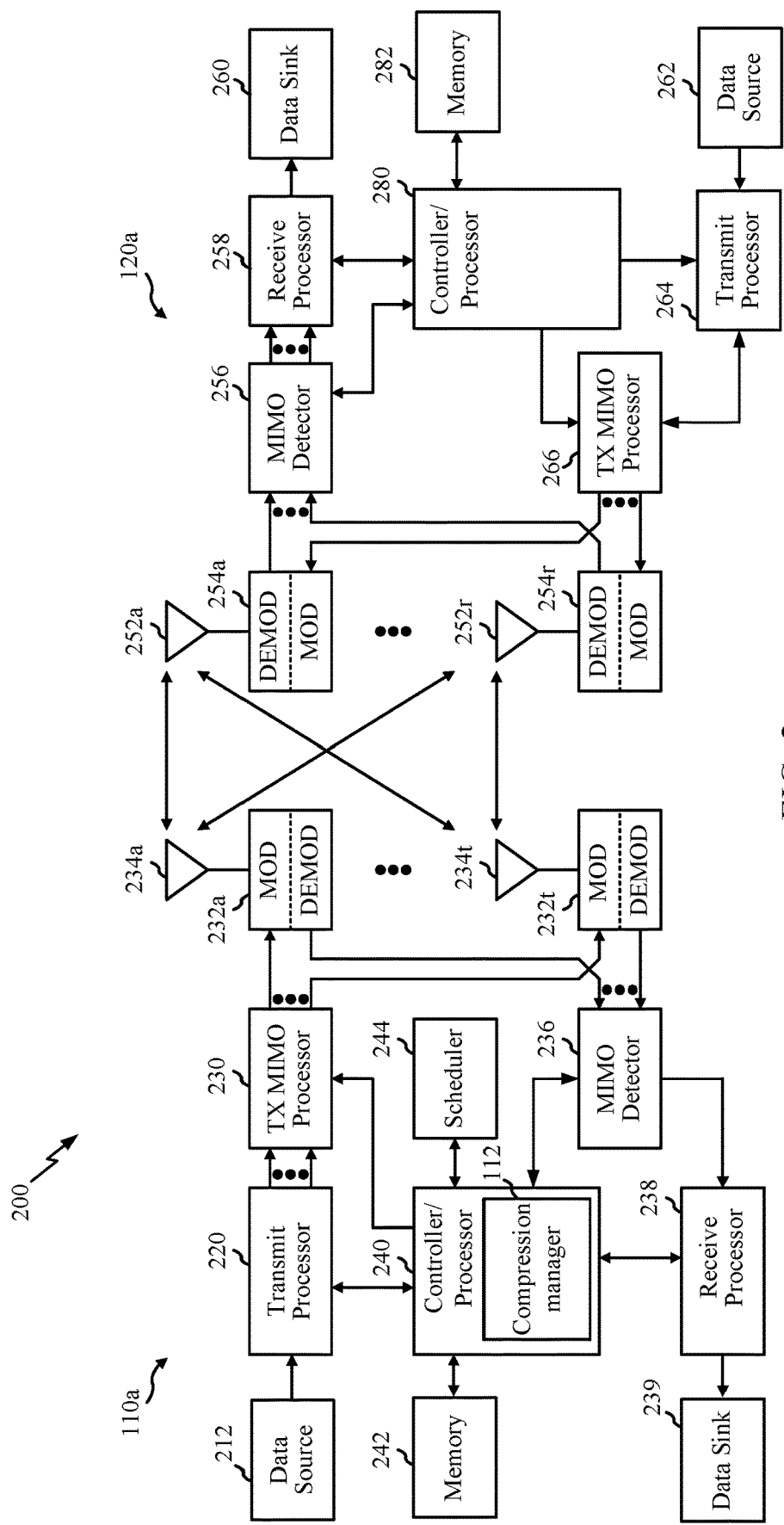
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. DL signals from modulators 232a-232t may be transmitted via the antennas 234a-234t, respectively.

At the UE 120a, the antennas 252a-252r may receive the DL signals from the BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink (UL), at UE 120a, a transmit processor 264 may receive and process data (e.g., for the PUSCH from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for single-carrier frequency division multiplexing (SC-FDM), etc.), and transmitted to the BS 110a. At the BS 110a, the UL signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has the compression manager 112, according to aspects described herein.

NR may utilize orthogonal frequency division multiplexing (OFDM) with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kilohertz (KHz) and other SCS may be defined with respect to the base SCS (e.g., 30 kHz, 60 kHz, 120 kHz, 240 kHz, etc.).

Figure 3:
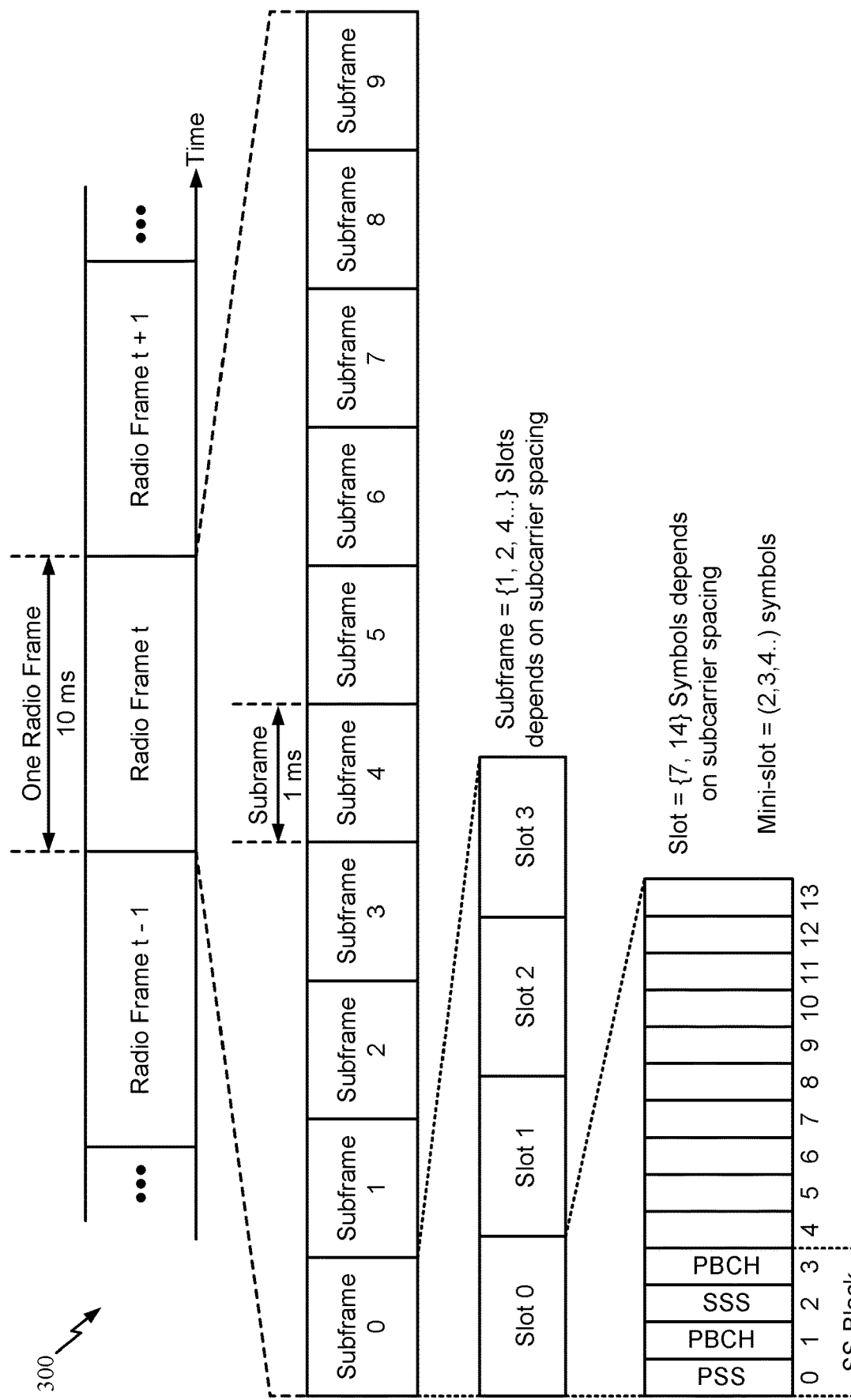
FIG. 3 is an example frame format for new radio (NR), in accordance with certain aspects of the present disclosure.

FIG. 3 is a diagram showing an example of a frame format 300 for NR. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Figure 4:
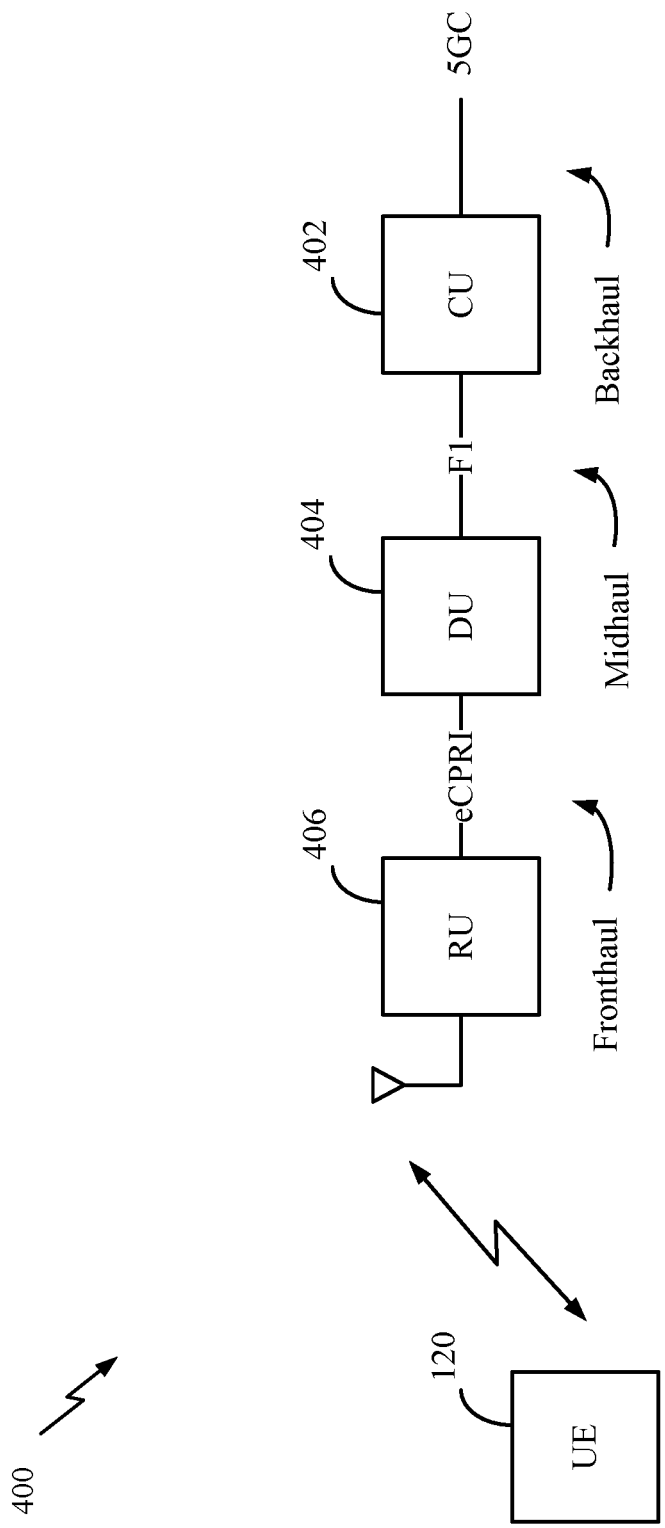
FIG. 4 illustrates an open-radio access network (O-RAN), in accordance with certain aspects of the present disclosure.

FIG. 4 illustrates an open-radio access network (O-RAN) 400, in accordance with certain aspects of the present disclosure. An O-RAN is a disaggregated approach to deploying mobile fronthaul and midhaul networks built on cloud native principles. As illustrated in FIG. 4, a centralized core network unit (CU) 402 may host core network functions. CU 402 may be centrally deployed and may be in communication with a distributed unit (DU) 404 that may host one or more remote radio units (RUs), such as RU 406 via an enhanced common public radio interface (eCPRI) interface. eCPRI is a high-speed serial interface that allows for a DU to reduce its burden by offloading some of its functionality to the RU. As illustrated, the RU may be in communication with a UE 120.

Example Compression Techniques for Data and
Reference Signal (RS) Resource Elements (REs)

Aspects of the present disclosure provide apparatus, methods, processing systems, and computer readable mediums for reference signal (RS) and data compression. For example, certain aspects provide flexibility in using different compression techniques (also referred to herein as different compression types) for RS resource elements (REs) and data REs that may be configured in the same section (e.g., a symbol) of a physical resource block (PRB). For example, RS REs may be compressed using a more robust compression technique than data REs due to the importance of RSs (e.g., demodulation RS (DMRS)) for estimating a channel and facilitating decoding of data.

In open-radio access network (RAN) (O-RAN), the method of compression is constant for every section in a single control plane (C-Plane) message. Likewise, the in-phase (I) and quadrature (Q) bitwidth of compressed samples is constant for every section in the single C-Plane message. Thus, if a symbol carries both RS and data REs, conventional implementations may apply the same compression technique for both RS and data REs within the PRB.

There is currently motivation to choose a data compression technique (also referred to as a compression type) that reduces front-haul bandwidth. As used herein, a compression type (or compression technique) generally refers to any technique that reduces the bandwidth associated with sending and receiving of reference signals or data (e.g., on a front-haul interface). The aspects described herein may be implemented with any suitable compression type. In the O-RAN framework, a few example compression types include block floating point (BFP) compression, block scaling compression, beamspace compression, or modulation compression. However, applying the same compression technique to RS REs may result in usage of relatively lossy compression for the RS REs because of the compression-decompression mechanism.

Certain aspects of the present disclosure are generally directed to techniques for compression of RSs and data. For example, different compression types may be employed for communication of RS REs and data REs in a symbol. For instance, a primary compression types may be selected and used for the data REs in a symbol, and another compression type may be selected and used for the RS REs in the symbol.

In certain aspects, RS REs may be compressed using a more robust and less lossy compression types such that estimation of the channel, which is essential for data decoding, is not affected while at the same time not compromising on data compression. For example, if a receiver node fails to receive DMRSs in a symbol, then the receiver node will be unable to decode the data in the symbol. Thus, a more robust compression types may be applied for the RS REs in the symbol such that the likelihood of the receiver node failing to receive the RS REs is decreased.

FIG. 5 is a flow diagram illustrating example operations 500 for wireless communication by a receiver node, in accordance with certain aspects of the present disclosure. The operations 500 may be performed, for example, by a receiver node, such as a base station (BS) (e.g., such as the BS 110a in the wireless communication network 100 of FIG. 1, or the remote radio unit (RU) 406 of FIG. 4).

Operations 500 may be implemented as software components that are executed and run on one or more processors (e.g., controller/processor 240 of FIG. 2). Further, the transmission and reception of signals by the receiver node in operations 500 may be enabled, for example, by one or more antennas (e.g., antennas 234 of FIG. 2). In certain aspects, the transmission and/or reception of signals by the receiver node may be implemented via a bus interface of one or more processors (e.g., controller/processor 240) obtaining and/or outputting signals.

Operations 500 may begin, at block 505, by a remote RU receiving, from a DU, a symbol having at least one RS in one or more first set of REs compressed using a first compression type and data in one or more second set of REs compressed using a second compression type. As used herein, data generally refers to data in a physical downlink shared channel (PDSCH) or a physical uplink shared channel (PUSCH), or data (e.g., control information) in physical downlink control channel (PDCCH) or physical uplink control channel (PUCCH). At block 510, the RU decompresses the at least one RS in the one or more first set of REs of the symbol in accordance with the first compression type and the data in the one or more second set of REs of the symbol in accordance with the second compression type.

FIG. 6 is a flow diagram illustrating example operations 600 for wireless communication, in accordance with certain aspects of the present disclosure. The operations 600 may be performed, for example, by a network node, such as the DU 404, as described with respect to FIG. 4. Operations 600 may be complementary to operations 500 performed by the receiver node (e.g., remote RU).

Operations 600 may be implemented as software components that are executed and run on one or more processors (e.g., controller/processor 240 of FIG. 2). Further, the transmission and reception of signals by the network node in operations 600 may be enabled, for example, by one or more antennas (e.g., antennas 234 of FIG. 2). In certain aspects, the sending and/or reception of signals by the DU may be implemented via a bus interface of one or more processors obtaining and/or outputting signals.

Operations 600 may begin, at block 605, by a DU compressing at least one RS in one or more first set of REs of a symbol and data in one or more second set of REs of the symbol, wherein the at least one RS is compressed using a first compression type and the data is compressed using a second compression type, and wherein the first compression type is different than the second compression type. At block 610, the DU sends, to a remote RU, the symbol having the at least one RS in the one or more first set of REs compressed using the first compression type and the data in the one or more second set of REs compressed using the second compression type.

In some aspects, the DU may send, to the RU, an indication (e.g., via a C-plane message or enhanced common public radio interface (eCPRI) message) of the first compression type for the at least one RS and the second compression type for the data. The C-plane message may include a first mask field (e.g., referred to as RE Mask 1 (reMask1)) indicating the one or more first REs having the at least one RS, and a second mask field (e.g., referred to as RE Mask 2 (reMask2)) indicating the one or more second REs having the data. The C-plane message may also include one or more fields indicating a section of a PRB having the symbol to which the indication of the first compression type and the second compression type apply, as described in more detail herein.

FIG. 7 is a flow diagram illustrating example operations 700 for wireless communication, in accordance with certain aspects of the present disclosure. The operations 700 may be performed, for example, by a node (e.g., an RU such as the RU 406 illustrated in FIG. 4 or a DU such as the DU 404 illustrated in FIG. 4).

Operations 700 may be implemented as software components that are executed and run on one or more processors (e.g., controller/processor 240 of FIG. 2). Further, the transmission and reception of signals by the node in operations 700 may be enabled, for example, by one or more antennas (e.g., antennas 234 of FIG. 2). In certain aspects, the transmission and/or reception of signals by the node may be implemented via a bus interface of one or more processors (e.g., controller/processor 240) obtaining and/or outputting signals.

The operations 700 may begin, at block 705, by the node applying different compression types for subsets of REs in a symbol, wherein the subsets of REs are associated with the same section ID, the section ID corresponding to a section of a resource block (RB) having at least the symbol. At block 710, the node may communicate the symbol between a remote RU and a DU using the different compression types. In some aspects, the subsets of REs are associated with different RE masks, each of the RE masks indicating whether one of the subsets of REs are for RS communication or data communication.

For example, operations 700 may be performed by an RU. In this case, the RU may receive a C-plane message indicating the compression techniques, the C-plane message indicating the different RE masks, each of the RE masks indicating a type of a respective one of the subsets of REs.

As another example, the operations 700 may be performed by a DU. In this case, the DU may send a C-plane message indicating the compression techniques, the C-plane message indicating the different RE masks, each of the RE masks indicating a type of a respective one of the subsets of REs. In either example, the indication of the compression techniques may be via reserved bits of the C-plane message, as described herein.

Figure 8A:
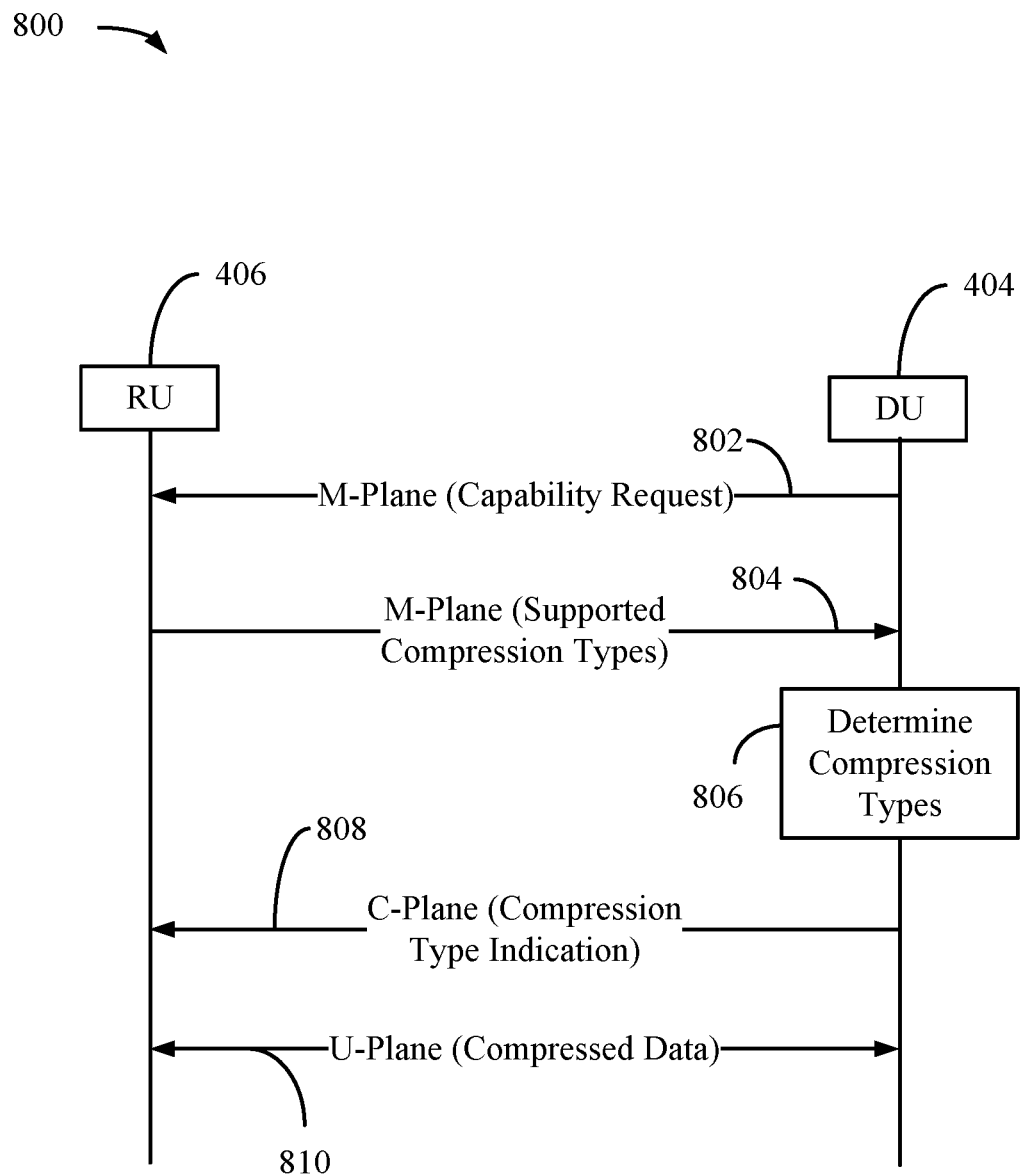
FIG. 8A illustrates a protocol for communication of reference signal (RS) resource elements (REs) and data REs in a symbol, in accordance with certain aspects of the present disclosure.

FIG. 8A illustrates a protocol 800 for communication of RS REs and data REs in a symbol, in accordance with certain aspects of the present disclosure. As illustrated, the DU 404 (e.g., O-DU) may send a management plane (M-plane) message 802 as a capability request. In response, the RU 406 (e.g., O-RU) may send an M-plane message 804 indicating supported compression types based on the capability request. When there is user data to be communicated, the RU and the DU may communicate data (e.g., data for uplink (UL) or downlink (DL)) via the user plane (U-plane). The data may be communicated via the fronthaul, as described with respect to FIG. 4. To reduce fronthaul overhead, the data communicated between the RU 406 and DU 404 may be compressed. For instance, at block 806, the DU 404 may select a first compression type to be applied for RS REs, and a second compression type to be applied for data REs, where the first compression type is different than the second compression type, as described herein. The first and second compression types may be selected based on the supported compression types indicated in the M-plane message 804. The DU 404 may send a C-plane message 808 (e.g., eCPRI message) indicating the selected compression types. The user-plane (U-plane) may then be used to communicate a PRB 810 having RS REs and data REs compressed in accordance with the selected compression techniques.

Figure 8B:
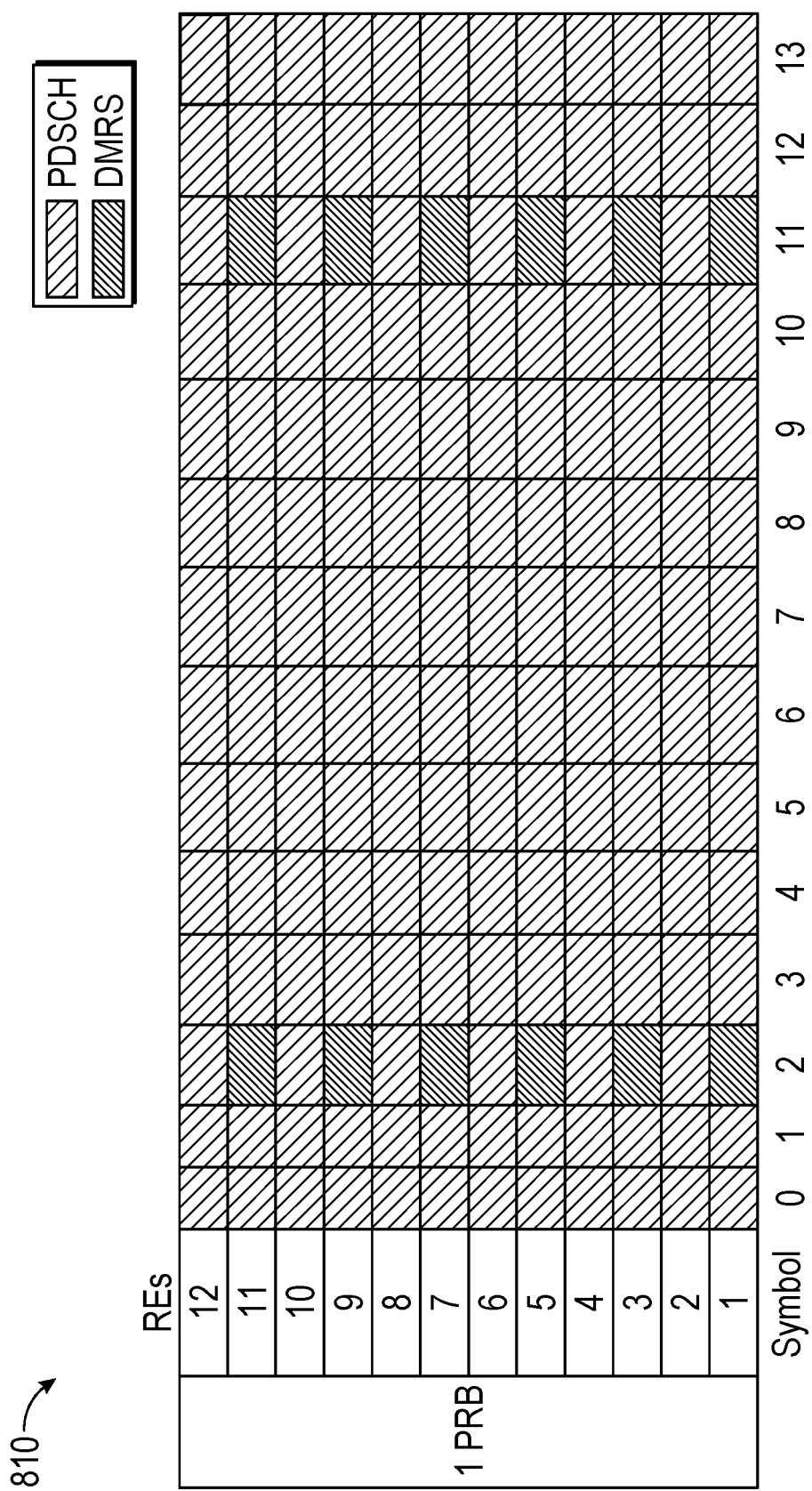
FIG. 8B illustrates a physical resource block (PRB) having a symbol with both RS REs and data REs, in accordance with certain aspects of the present disclosure.

FIG. 8B illustrates the PRB 810 having symbols with both RS REs and data REs, in accordance with certain aspects of the present disclosure. As illustrated, each of symbols 2 and 11 has multiple DMRS REs and data REs. In some aspects, a different compression type (also referred to herein as a compression technique) may be applied for the DMRS REs and the data REs in a symbol (e.g., symbol 2).

Figure 9:
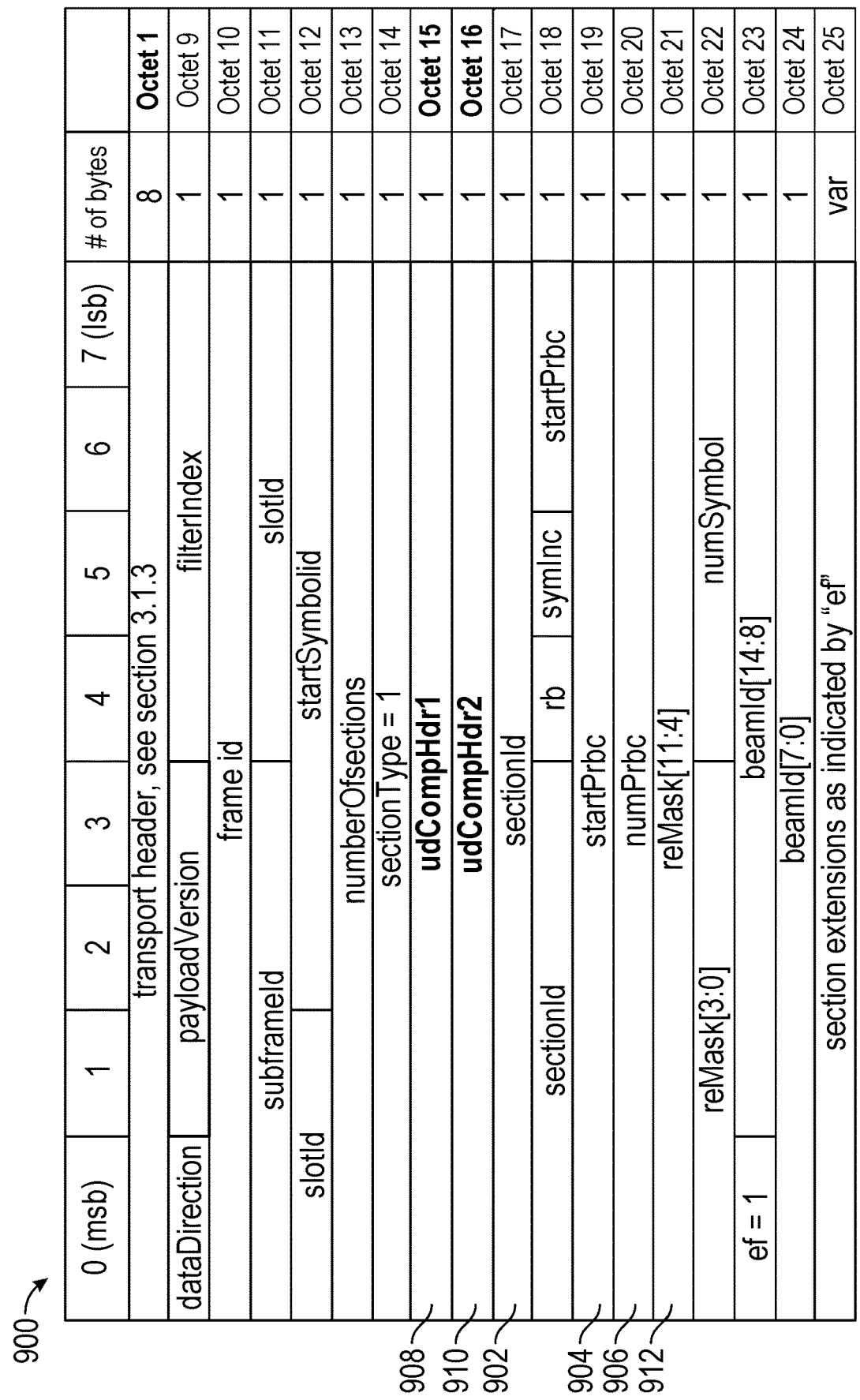
FIG. 9 illustrates a control-plane (C-plane) message used to indicate a compression technique used for RS and data REs, in accordance with certain aspects of the present disclosure.

FIG. 9 illustrates a C-plane message 900 used to indicate a compression technique used for RS and data REs, in accordance with certain aspects of the present disclosure. As illustrated, the C-plane message 900 (e.g., corresponding to C-plane message 808) may include section fields, such as a section ID field (sectionid) 902, start PRB field (startPrbc) 904, and number of contiguous PRBs field (numPrbc) 906, that indicate a section of the PRB 810 to which parameters of the C-plane message 900 apply. For example, the PRB 810 may include compression header fields 908, 910 (e.g., user data compression header (udCompHdr1 908, udCompHdr2 910) fields) that indicate a compression type used for RS REs and data REs, respectively, of the section associated with the section ID field 902. The section associated with section ID field 902 may include symbol 2 of the PRB 810, for example.

In certain aspects, different RE mask (reMask) fields may be used to differentiate between the RS and data REs within a section. For example, for a symbol, there may be two different reMask fields, one for data REs and the other for RS REs. As an example, for PDSCH (data) and frequency multiplexed DMRS REs, a PDSCH reMask1 may indicate 010101010101, and a DMRS reMask2 may indicate 101010101010. For instance, the reMask field 912 may indicate the PDSCH reMask1 associated with the section ID field 902, and another section ID (not shown in FIG. 9) may be included in the C-plane message with the same identifier as the section ID field 902 with an associated reMask field for indicating the DMRS reMask2. Thus, the compression header field 908 may correspond to the PDSCH reMask1 and indicate the compression type for data REs, and the compression header field 910 may correspond to the DMRS reMask2 and indicate the compression type for the RS REs.

In some aspects, a currently "reserved" field in the C-plane message may be used to indicate the second compression type (e.g., compression header field 910) for the second reMask value (e.g., DMRS reMask2). In this manner, the size of the header may not be increased as compared to conventional implementations. In some cases, a single reMask value may be used for a section ID. In such a case, only the associated udCompHdr1may be applicable in the C-plane message. For example, udCompHdr2 may not be provided in the C-plane message for a section ID that is associated with a single reMask value.

Certain aspects provide a mechanism to apply different compression techniques to different reMask REs for the same section ID. This mechanism may be optional and communicated via the management-plane (M-plane). A new parameter may be added for communicating compression information in the M-Plane. For example, in response to capability request sent to a RU, by a DU, via an M-Plane message, the RU may communicate its capability to the DU via the M-plane (e.g., via another M-plane message), as described with respect to FIG. 8A (e.g., an M-plane message 804 indicating supported compression types based on the capability request). The RU may indicate support for various compression types. The DU may then select two of the compression types for RS REs and data REs, and indicate to the RU the two compression types to be used, as described with respect to FIG. 8A (e.g., a C-plane message 808 indicating the selected compression types).

The aspects described herein provide flexibility to use different compression types for data and RS REs such that RSs may be protected with a more robust and less lossy compression type without compromising on compression for data REs. Moreover, certain aspects of the present disclosure may be implemented without increasing the header size of the eCPRI message, resulting in no overhead added in the C-plane. Moreover, a single communication from the DU to the RU through the M-plane may be used to communicate the use of reserved bits for indicating a second compression type (e.g., via udCompHdr2) for RS REs.

While certain aspects of the present disclosure have been described for DMRS REs to facilitate understanding, the aspects described herein may be applied for compression of any suitable RS REs configured in a symbol along with data REs. For instance, the aspects described herein may be applied for data in PDSCH (PDCCH, PUSCH, or PUCCH) along with at least one RS including a DMRS, a phase tracking RS (PTRS), a channel sate information-RS (CSI-RS), a (location) tracking RS (TRS), a remote interface management-RS (RIM-RS), a positioning RS (PRS), a sounding RS (SRS), etc.

Example Wireless Communications Devices

Figure 10:
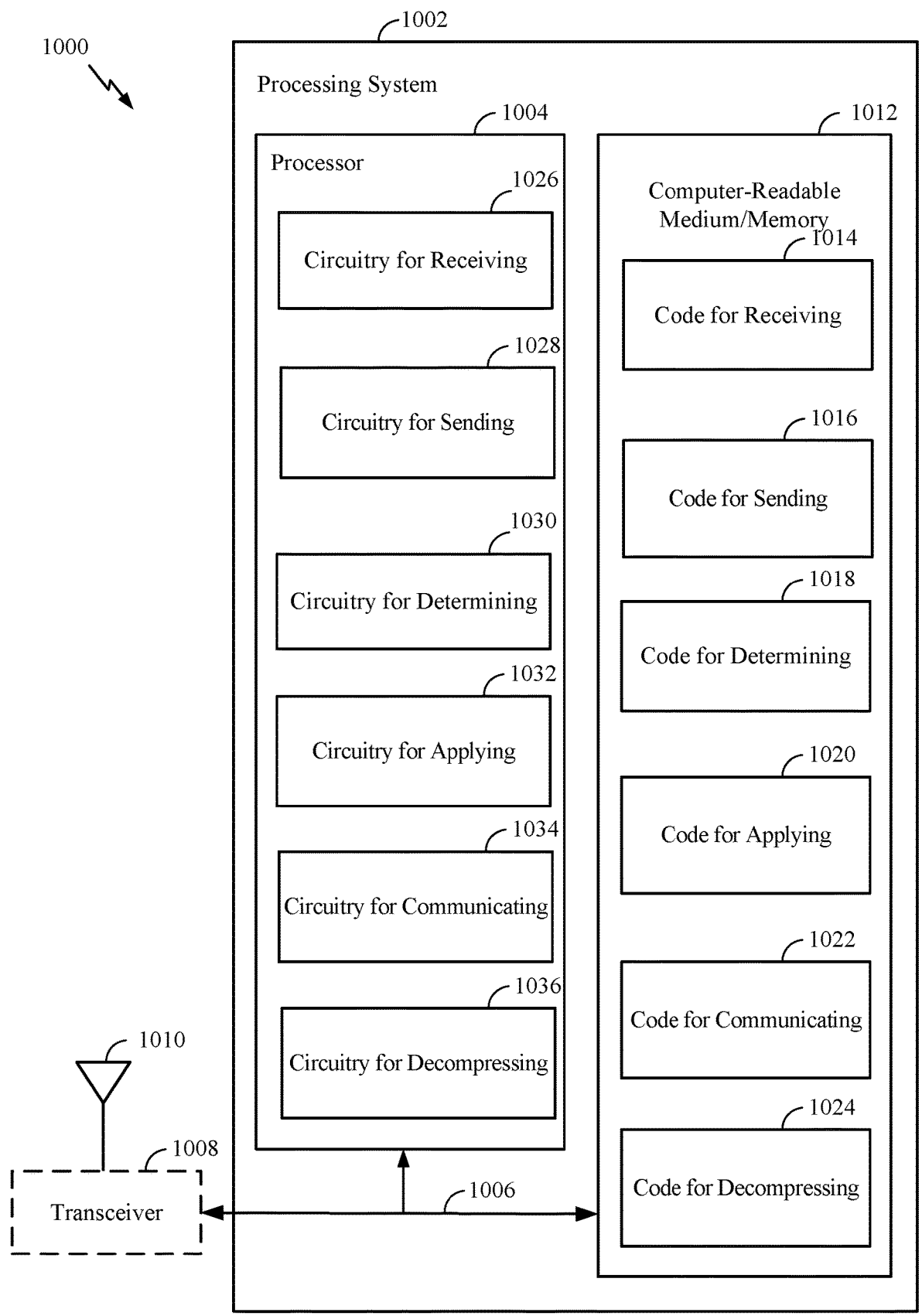
FIG. 10 illustrates a communications device that may include various components configured to perform operations for the techniques disclosed herein in accordance with certain aspects of the present disclosure.

FIG. 10 illustrates a communications device 1000 that may include various components (e.g., corresponding to means-plus-function components) operable, configured, or adapted to perform operations for the techniques disclosed herein, such as the operations illustrated in FIGS. 5 and 7. In some examples, communications device 1000 may be a receiver node, such as a base station (BS) (e.g., such as the BS 110a in the wireless communication network 100, or the remote radio unit (RU) 406 of FIG. 4).

Communications device 1000 includes a processing system 1002 (e.g., corresponding to controller/processor 240) coupled to a transceiver 1008 (e.g., a transmitter and/or a receiver). Transceiver 1008 may correspond to one or more of the transmit processor 220, TX MIMO processor 230, modulator/demodulator 232, the receive processor 238, and the MIMO detector 236. Transceiver 1008 is configured to transmit and receive signals for the communications device 1000 via an antenna 1010, such as the various signals as described herein. Processing system 1002 may be configured to perform processing functions for the communications device 1000, including processing signals received and/or to be transmitted by the communications device 1000.

Processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIGS. 5 and 7, or other operations for performing the various techniques discussed herein for RS and data compression.

In certain aspects, computer-readable medium/memory 1012 stores code 1014 (an example means for) for receiving; code 1016 (an example means for) for sending, code 1018 (an example means for) for determining; code 1020 (an example means for) for applying; code 1022 (an example means for) for communicating; and code 1024 (an example means for) for decompressing.

In certain aspects, code 1014 for receiving may include code for receiving a symbol having at least one reference signal (RS) in one or more first set of resource elements (REs) compressed using a first compression type and data in one or more second set of REs compressed using a second compression type. In certain aspects, code 1014 for receiving may include code for receiving, from the distributed unit (DU), an indication of compression types or a capability request. In certain aspects, code 1016 for sending may include code for sending supported compression types. In certain aspects, code 1018 for determining may include code for determining compression types. In certain aspects, code 1020 for applying may include code for applying different compression types for subsets of REs in a symbol. In certain aspects, code 1022 for communicating may include code for communicating, with a DU, the symbol having the one or more first REs and the one or more second REs. In certain aspects, code 1024 for decompressing may include code for decompressing using different compression/decompression types.

In certain aspects, the processor 1004 has circuitry configured to implement the code stored in the computer-readable medium/memory 1012. The processor 1004 includes circuitry 1026 (an example means for) for receiving; circuitry 1028 (an example means for) for sending; circuitry 1030 (an example means for) for determining; circuitry 1032 (an example means for) for applying; circuitry 1034 for communicating; and circuitry 1036 (an example means for) for decompressing.

In certain aspects, circuitry 1026 for receiving may include circuitry for receiving a symbol having at least one RS in one or more first set of REs compressed using a first compression type and data in one or more second set of REs compressed using a second compression type. In certain aspects, circuitry 1026 for receiving may include circuitry for receiving, from the DU, compression types or a capability request. In certain aspects, circuitry 1028 for sending may include circuitry for sending supported compression types. In certain aspects, circuitry 1030 for determining may include circuitry for determining compression types. In certain aspects, circuitry 1032 for applying may include circuitry for applying different compression types. In certain aspects, circuitry 1034 for communicating may include circuitry for communicating, with a DU, the symbol having the one or more first REs and the one or more second REs. In certain aspects, circuitry 1036 for decompressing may include circuitry for decompressing using different compression/decompression types.

Figure 11:
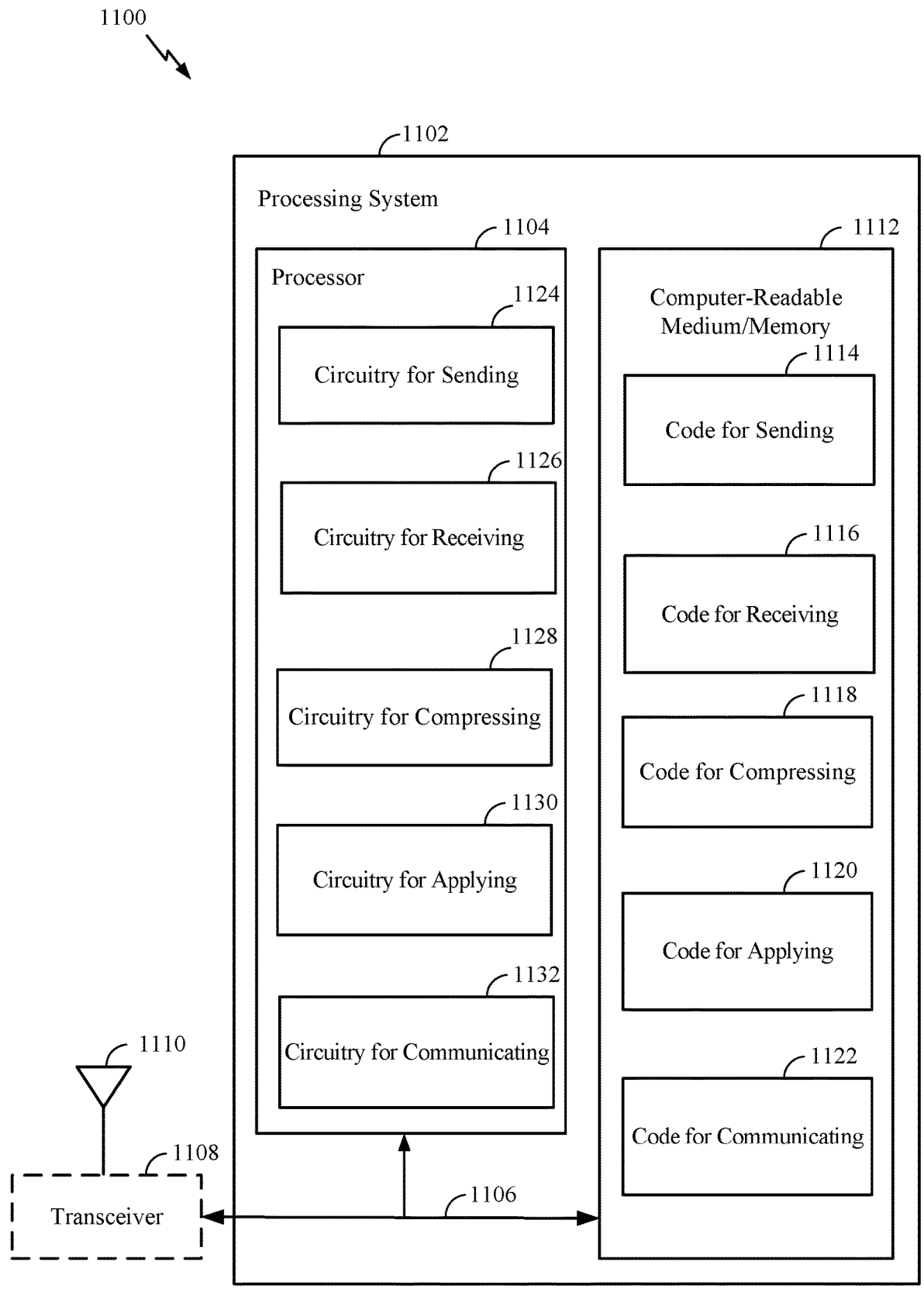
FIG. 11 illustrates a communications device that may include various components configured to perform operations for the techniques disclosed herein, in accordance with certain aspects of the present disclosure.

FIG. 11 illustrates a communications device 1100 that may include various components (e.g., corresponding to means-plus-function components) operable, configured, or adapted to perform operations for the techniques disclosed herein, such as the operations illustrated in FIGS. 6 and 7. In some examples, communications device 1100 may be a network node, such as the distributed unit (DU) 404, as described with respect to FIG. 4.

Communications device 1100 includes a processing system 1102 (e.g., corresponding to controller/processor 240) coupled to a transceiver 1108 (e.g., a transmitter and/or a receiver). Transceiver 1108 may correspond to one or more of the transmit processor 220, TX MIMO processor 230, modulator/demodulator 232, the receive processor 238, and the MIMO detector 236. Transceiver 1108 is configured to transmit and receive signals for the communications device 1100 via an antenna 1110, such as the various signals as described herein. Processing system 1102 may be configured to perform processing functions for the communications device 1100, including processing signals received and/or to be transmitted by the communications device 1100.

Processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIGS. 6 and 7, or other operations for performing the various techniques discussed herein for RS and data compression.

In certain aspects, computer-readable medium/memory 1112 stores code 1114 (an example means for) for sending; code 1116 (an example means for) for receiving, code 1118 (an example means for) for compressing; code 1120 (an example means for) for applying; and code 1122 (an example means for) for communicating.

In certain aspects, code 1114 for sending may include code for sending, to the RU, an indication of compression types or a capability message. In certain aspects, code 1116 for receiving may include code for receiving supported compression types In certain aspects, code 1118 for compressing may include code for compressing at least one RS in one or more first set of REs of a symbol and data in one or more second set of REs of the symbol, wherein the at least one RS is compressed using a first compression type and the data is compressed using a second compression type, and wherein the first compression type is different than the second compression type. In certain aspects, code 1120 for applying may include code for applying different compression types for subsets of REs in a symbol. In certain aspects, code 1122 for communicating may include code for communicating, with a remote RU, the symbol having the one or more first REs and the one or more second REs.

In certain aspects, the processor 1104 has circuitry configured to implement the code stored in the computer-readable medium/memory 1112. The processor 1104 includes circuitry 1124 (an example means for) for sending; circuitry 1126 (an example means for) for receiving; circuitry 1128 (an example means for) for compressing; circuitry 1130 (an example means for) for applying; and circuitry 1132 for communicating.

In certain aspects, circuitry 1124 for sending may include circuitry for sending, to the RU, an indication of compression types or a capability message. In certain aspects, circuitry 1126 for receiving may include circuitry for receiving supported compression types. In certain aspects, circuitry 1128 for compressing may include circuitry for compressing at least one RS in one or more first set of REs of a symbol and data in one or more second set of REs of the symbol, wherein the at least one RS is compressed using a first compression type and the data is compressed using a second compression type, and wherein the first compression type is different than the second compression type. In certain aspects, circuitry 1130 for applying may include circuitry for applying different compression types for subsets of REs in a symbol. In certain aspects, circuitry 1132 for communicating may include circuitry for communicating, with a remote RU, the symbol having the one or more first REs and the one or more second The compression manager 112 may support wireless communication in accordance with examples as disclosed herein.

The compression manager 112 may be an example of means for performing various aspects described herein. The compression manager 112, or its sub-components, may be implemented in hardware (e.g., in uplink (UL) resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, the compression manager 112, or its sub-components, may be implemented in code (e.g., as configuration management software or firmware) executed by a processor, or any combination thereof If implemented in code executed by a processor, the functions of the compression manager 112, or its sub-components may be executed by a general-purpose processor, a DSP, an ASIC, a FPGA or other programmable logic device.

In some examples, the compression manager 112 may be configured to perform various operations (e.g., receiving, determining, transmitting/sending) using or otherwise in cooperation with the transceiver 1008 or 1108.

The compression manager 112, or its sub-components, may be physically located at various positions, including being distributed such that portions of functions are implemented at different physical locations by one or more physical components. In some examples, the compression manager 112, or its sub-components, may be a separate and distinct component in accordance with various aspects of the present disclosure. In some examples, the compression manager 112, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

EXAMPLE CLAUSES

Implementation examples are described in the following numbered clauses:

Clause 1: An apparatus for wireless communication by a distributed unit (DU), comprising: a memory; and one or more processors coupled to the memory, the memory and the one or more processors being configured to: compress at least one reference signal (RS) in one or more first set of resource elements (REs) of a symbol and data in one or more second set of REs of the symbol, wherein the at least one RS is compressed using a first compression type and the data is compressed using a second compression type, and wherein the first compression type is different than the second compression type; and send, to a remote radio unit (RU), the symbol having the at least one RS in the one or more first set of REs compressed using the first compression type and the data in the one or more second set of REs compressed using the second compression type.

Clause 2: The apparatus of Clause 1, wherein the memory and the one or more processors are further configured to send, to the RU, an indication of the first compression type for the at least one RS and the second compression type for the data.

Clause 3: The apparatus of Clause 2, wherein the indication is sent via a control-plane (C-plane) message.

Clause 4: The apparatus of Clause 3, wherein the C-plane message comprises an enhanced common public radio interface (eCPRI) message.

Clause 5: The apparatus of Clause 3 or 4, wherein the C-plane message further comprises a first mask field indicating the one or more first set of REs having the at least one RS, and a second mask field indicating the one or more second REs having the data.

Clause 6: The apparatus of any of Clauses 3-5, wherein the C-plane message comprises one or more fields indicating a section of a physical resource block (PRB) having the symbol to which the indication of the first compression type and the second compression type apply.

Clause 7: The apparatus of any of Clauses 1-6, wherein the at least one RS comprises a demodulation reference signal (DMRS), a phase tracking reference signal (PTRS), a channel state information-reference signal (CSI-RS), a tracking reference signal (TRS), a remote interface management (RIM)-reference signal (RIM-RS), a positioning reference signal (PRS), or a sounding reference signal (SRS).

Clause 8: The apparatus of any of Clauses 1-7, wherein the data comprises data in a physical downlink shared channel (PDSCH) or a physical uplink shared channel (PUSCH) or control information in a physical downlink control channel (PDCCH) or a physical uplink control channel (PUCCH).

Clause 9: The apparatus of any of Clauses 1-8, wherein the memory and the one or more processors are further configured to: send a capability request; and receive supported compression types based on the capability request, wherein the first and second compression types are selected based on the supported compression types.

Clause 10: The apparatus of Clause 9, wherein the capability request is sent via a management plane (M-plane) message and the supported compression types are received via another M-plane message.

Clause 11: An apparatus for wireless communication by a remote radio unit (RU), comprising: a memory; and one or more processors coupled to the memory, the memory and the one or more processors being configured to: receive, from a DU, a symbol having at least one RS in one or more first set of REs compressed using a first compression type and data in one or more second set of REs compressed using a second compression type; and decompress the at least one RS in the one or more first set of REs of the symbol in accordance with the first compression type and the data in the one or more second set of REs of the symbol in accordance with the second compression type.

Clause 12: The apparatus of Clause 11, wherein the memory and the one or more processors are further configured to receive, from the DU, an indication of the first compression type for the at least one RS and the second compression type for the data.

Clause 13: The apparatus of Clause 12, wherein the indication is received via a control-plane (C-plane) message.

Clause 14: The apparatus of Clause 13, wherein the C-plane message comprises an enhanced common public radio interface (eCPRT) message.

Clause 15: The apparatus of Clause 13 or 14, wherein the C-plane message further comprises a first mask field indicating the one or more first set of REs having the at least one RS, and a second mask field indicating the one or more second set of REs having the data.

Clause 16: The apparatus of any of Clauses 13-15, wherein the C-plane message comprises one or more fields indicating a section of a physical resource block (PRB) having the symbol to which the indication of the first compression type and the second compression type apply.

Clause 17: The apparatus of any of Clauses 11-16, wherein the at least one RS comprises a demodulation reference signal (DMRS), a phase tracking reference signal (PTRS), a channel state information reference signal (CSI-RS), a tracking reference signal (TRS), a remote interface management (RIM)-reference signal (RIM-RS), a positioning reference signal (PRS), or a sounding reference signal (SRS).

Clause 18: The apparatus of any of Clauses 11-17, wherein the data comprises data in a physical downlink shared channel (PDSCH) or a physical uplink shared channel (PUSCH) or control information in a physical downlink control channel (PDCCH) or a physical uplink control channel (PUCCH).

Clause 19: The apparatus of any of Clauses 11-18, wherein the memory and the one or more processors are further configured to: receive a capability request; and send supported compression types based on the capability request, wherein the first and second compression types are selected based on the supported compression types.

Clause 20: The apparatus of Clause 19, wherein the capability request is received via a management plane (M-plane) message and the supported compression types are sent via another M-plane message.

Clause 21: An apparatus for wireless communication, comprising: a memory; and one or more processors coupled to the memory, the memory and the one or more processors being configured to: apply different compression types for subsets of resource elements (REs) in a symbol, wherein the subsets of REs are associated with the same section identifier (ID), the section ID corresponding to a section of a resource block (RB) having at least the symbol; and communicate the symbol between a remote radio unit (RU) and a distributed unit (DU) using the different compression types.

Clause 22: The apparatus of Clause 21, wherein the subsets of REs are associated with different RE masks, each of the RE masks indicating whether one of the subsets of REs are for reference signal (RS) communication or data communication.

Clause 23: The apparatus of Clause 22, wherein the RS communication comprises a demodulation reference signal (DMRS), a phase tracking reference signal (PTRS), a channel state information reference signal (CSI-RS), a tracking reference signal (TRS), a remote interface management (RIM)-reference signal (RIM-RS), a positioning reference signal (PRS), or a sounding reference signal (SRS).

Clause 24: The apparatus of Clause 22 or 23, wherein the data communication comprises data in a physical downlink shared channel (PDSCH) or a physical uplink shared channel (PUSCH) or control information in a physical downlink control channel (PDCCH) or a physical uplink control channel (PUCCH).

Clause 25: The apparatus of any of Clauses 21-24, wherein the apparatus is the RU, the memory and the one or more processors being further configured to receive a control-plane (C-plane) message indicating the compression types, the C-plane message further indicating different RE masks, each of the RE masks indicating a type of a respective one of the subsets of REs.

Clause 26: The apparatus of Clause 25, wherein the indication of the compression types is via reserved bits of the C-plane message.

Clause 27: The apparatus of any of Clauses 21-26, wherein the apparatus is the DU, the memory and the one or more processors being further configured to sending a control-plane (C-plane) message indicating the compression types, the C-plane message further indicating different RE masks, each of the RE masks indicating a type of a respective one of the subsets of REs.

Clause 28: The apparatus of Clause 27, wherein the indication of the compression types is via reserved bits of the C-plane message.

Clause 29: A method for wireless communication by a distributed unit (DU), comprising: determining a first compression type for compression of at least one reference signal (RS) in one or more first set of resource elements (REs) of a symbol and a second compression type for compression of data in one or more second set of REs of the symbol, wherein the first compression type is different than the second compression type; and communicating, with a remote radio unit (RU), the symbol having the one or more first REs and the one or more second REs.

Clause 30: A method for wireless communication by a remote radio unit (RU), comprising: determining a first compression type for compression of at least one reference signal (RS) in one or more first resource elements (REs) of a symbol and a second compression type for compression of data in one or more second REs of the symbol, wherein the first compression type is different than the second compression type; and communicating, with a distributed unit (DU), the symbol having the one or more first REs and the one or more second REs.

Clause 31: A method for wireless communication comprising: applying different compression types for subsets of resource elements (REs) in a symbol, wherein the subsets of REs are associated with the same section identifier (ID), the section ID corresponding to a section of a resource block (RB) having at least the symbol; and communicating the symbol between a remote radio unit (RU) and a distributed unit (DU) using the different compression types.

Clause 32: A method for wireless communication by a remote radio unit (RU), comprising: determining a first compression type for compression of at least one reference signal (RS) in one or more first resource elements (REs) of a symbol and a second compression type for compression of data in one or more second REs of the symbol; and communicating, with a distributed unit (DU), the symbol having the one or more first REs and the one or more second REs.

Clause 33: The method of Clause 32, wherein determining the first compression type and the second compression type comprises receiving, from the DU, an indication to the RU of the first compression type for the at least one RS and the second compression type for the data.

Clause 34: The method of Clause 33, wherein the indication is received via a control-plane (C-plane) message.

Clause 35: The method of Clause 34, wherein the C-plane message comprises an enhanced common public radio interface (eCPRT) message.

Clause 36: The method of Clause 34 or 35, wherein the C-plane message further comprises a first mask field indicating the one or more first REs having the at least one RS, and a second mask field indicating the one or more second REs having the data.

Clause 37: The method of any of Clauses 34-36, wherein the C-plane message comprises one or more fields indicating a section of a physical resource block (PRB) having the symbol to which the indication of the first compression type and the second compression type apply.

Clause 38: The method of any of Clauses 32-37, wherein the at least one RS comprise a demodulation reference signal (DMRS), a phase tracking reference signal (PTRS), or channel state information-reference signal (CSI-RS).

Clause 39: A method for wireless communication by a distributed unit (DU), comprising: determining a first compression type for compression of at least one reference signal (RS) in one or more first set of resource elements (REs) of a symbol and a second compression type for compression of data in one or more second set of REs of the symbol; and communicating, with a remote radio unit (RU), the symbol having the one or more first REs and the one or more second REs.

Clause 40: The method of Clause 39, further comprising sending, to the RU, an indication of the first compression type for the at least one RS and the second compression type for the data.

Clause 41: The method of Clause 40, wherein the indication is sent via a control-plane (C-plane) message.

Clause 42: The method of Clause 41, wherein the C-plane message comprises an enhanced common public radio interface (eCPRT) message.

Clause 43: The method of Clause 41 or 42, wherein the C-plane message further comprises a first mask field indicating the one or more first REs having the at least one RS, and a second mask field indicating the one or more second REs having the data.

Clause 44: The method of any of Clauses 41-43, wherein the C-plane message comprises one or more fields indicating a section of a physical resource block (PRB) having the symbol to which the indication of the first compression type and the second compression type apply.

Clause 45: The method of any of Clauses 39-44, wherein the at least one RS comprise a demodulation reference signal (DMRS), a phase tracking reference signal (PTRS), or channel state information-reference signal (CSI-RS).

Clause 46: A method for wireless communication, comprising: applying different compression techniques for subsets of resource elements (REs) in a symbol, wherein the subsets of REs are associated with different RE masks, and wherein the subsets of REs are associated with the same section identifier (ID), the section ID corresponding to a section of a resource block having the symbol; and communicating the symbol between a remote radio unit (RU) and a distributed unit (DU) using the different compression techniques.

Clause 47: The method of Clause 46, wherein the method is performed by the RU, the method further comprising receiving a control-plane (C-plane) message indicating the compression techniques, the C-plane message indicating the different RE masks, each of the RE masks indicating a type of a respective one of the subsets of REs.

Clause 48: The method of Clause 46 or 47, wherein the method is performed by the DU, the method further comprising sending a control-plane (C-plane) message indicating the compression techniques, the C-plane message indicating the different RE masks, each of the RE masks indicating a type of a respective one of the subsets of REs.

Clause 49: The method of Clause 47 or 48, wherein the indication of the compression techniques is via reserved bits of the C-plane message.

Clause 50: An apparatus, comprising: a memory; and one or more processors coupled to the memory, the memory and the one or more processors being configured to perform a method in accordance with any one of Clauses 32-49.

Clause 51: An apparatus, comprising means for performing a method in accordance with any one of Clauses 1-49.

Clause 52: A non-transitory computer-readable medium comprising executable instructions that, when executed by one or more processors of an apparatus, cause the apparatus to perform a method in accordance with any one of Clauses 1-49.

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication by a distributed unit (DU), comprising:
   memory; and
   one or more processors coupled to the memory, the one or more processors, individually or collectively, being configured to:
      compress at least one reference signal (RS) in one or more first set of resource elements (REs) of a symbol and data in one or more second set of REs of the symbol, wherein the at least one RS is compressed using a first compression type and the data is compressed using a second compression type, and wherein the first compression type is different than the second compression type; and
      send, to a remote radio unit (RU), the symbol having the at least one RS in the one or more first set of REs compressed using the first compression type and the data in the one or more second set of REs compressed using the second compression type.

2. The apparatus of claim 1, wherein the one or more processors, individually or collectively, are further configured to send, to the RU, an indication of the first compression type for the at least one RS and the second compression type for the data.

3. The apparatus of claim 2, wherein the indication is sent via a control-plane (C-plane) message.

4. The apparatus of claim 3, wherein the C-plane message comprises an enhanced common public radio interface (eCPRI) message.

5. The apparatus of claim 3, wherein the C-plane message further comprises a first mask field indicating the one or more first set of REs having the at least one RS, and a second mask field indicating the one or more second set of REs having the data.

6. The apparatus of claim 3, wherein the C-plane message comprises one or more fields indicating a section of a physical resource block (PRB) having the symbol to which the indication of the first compression type and the second compression type apply.

7. The apparatus of claim 1, wherein the at least one RS comprises a demodulation reference signal (DMRS), a phase tracking reference signal (PTRS), a channel state information-reference signal (CSI-RS), a tracking reference signal (TRS), a remote interface management (RIM)-reference signal (RIM-RS), a positioning reference signal (PRS), or a sounding reference signal (SRS).

8. The apparatus of claim 1, wherein the data comprises data in a physical downlink shared channel (PDSCH) or a physical uplink shared channel (PUSCH) or control information in a physical downlink control channel (PDCCH) or a physical uplink control channel (PUCCH).

9. The apparatus of claim 1, wherein the one or more processors, individually or collectively, are further configured to:
   send a capability request; and
   receive supported compression types based on the capability request, wherein the first and second compression types are selected based on the supported compression types.

10. The apparatus of claim 9, wherein the capability request is sent via a management plane (M-plane) message and the supported compression types are received via another M-plane message.

11. An apparatus for wireless communication by a remote radio unit (RU), comprising:
   memory; and
   one or more processors coupled to the memory, the one or more processors, individually or collectively, being configured to:
      receive, from a distributed unit (DU), a symbol having at least one reference signal (RS) in one or more first set of resource elements (REs) compressed using a first compression type and data in one or more second set of REs compressed using a second compression type; and
      decompress the at least one RS in the one or more first set of REs of the symbol in accordance with the first compression type and the data in the one or more second set of REs of the symbol in accordance with the second compression type.

12. The apparatus of claim 11, wherein the one or more processors, individually or collectively, are further configured to receive, from the DU, an indication of the first compression type for the at least one RS and the second compression type for the data.

13. The apparatus of claim 12, wherein the indication is received via a control-plane (C-plane) message.

14. The apparatus of claim 13, wherein the C-plane message comprises an enhanced common public radio interface (eCPRI) message.

15. The apparatus of claim 13, wherein the C-plane message further comprises a first mask field indicating the one or more first set of REs having the at least one RS, and a second mask field indicating the one or more second set of REs having the data.

16. The apparatus of claim 13, wherein the C-plane message comprises one or more fields indicating a section of a physical resource block (PRB) having the symbol to which the indication of the first compression type and the second compression type apply.

17. The apparatus of claim 11, wherein the at least one RS comprises a demodulation reference signal (DMRS), a phase tracking reference signal (PTRS), a channel state information reference signal (CSI-RS), a tracking reference signal (TRS), a remote interface management (RIM)-reference signal (RIM-RS), a positioning reference signal (PRS), or a sounding reference signal (SRS).

18. The apparatus of claim 11, wherein the data comprises data in a physical downlink shared channel (PDSCH) or a physical uplink shared channel (PUSCH) or control information in a physical downlink control channel (PDCCH) or a physical uplink control channel (PUCCH).

19. The apparatus of claim 11, wherein the one or more processors, individually or collectively, are further configured to:
receive a capability request; and
send supported compression types based on the capability request, wherein the first and second compression types are selected based on the supported compression types.

20. The apparatus of claim 19, wherein the capability request is received via a management plane (M-plane) message and the supported compression types are sent via another M-plane message.

21. An apparatus for wireless communication, comprising:
memory; and
one or more processors coupled to the memory, the one or more processors, individually or collectively, being configured to:
apply different compression types for subsets of resource elements (REs) in a symbol, wherein the subsets of REs are associated with the same section identifier (ID), the section ID corresponding to a section of a resource block (RB) having at least the symbol; and
communicate the symbol between a remote radio unit (RU) and a distributed unit (DU) using the different compression types.

22. The apparatus of claim 21, wherein the subsets of REs are associated with different RE masks, each of the RE masks indicating whether one of the subsets of REs are for reference signal (RS) communication or data communication.

23. The apparatus of claim 22, wherein the RS communication comprises a demodulation reference signal (DMRS), a phase tracking reference signal (PTRS), a channel state information reference signal (CSI-RS), a tracking reference signal (TRS), a remote interface management (RIM)-reference signal (RIM-RS), a positioning reference signal (PRS), or a sounding reference signal (SRS).

24. The apparatus of claim 22, wherein the data communication comprises data in a physical downlink shared channel (PDSCH) or a physical uplink shared channel (PUSCH) or control information in a physical downlink control channel (PDCCH) or a physical uplink control channel (PUCCH).

25. The apparatus of claim 21, wherein the apparatus is the RU, the one or more processors, individually or collectively, being further configured to receive a control-plane (C-plane) message indicating the compression types, the C-plane message further indicating different RE masks, each of the RE masks indicating a type of a respective one of the subsets of REs.

26. The apparatus of claim 25, wherein the indication of the compression types is via reserved bits of the C-plane message.

27. The apparatus of claim 21, wherein the apparatus is the DU, the one or more processors, individually or collectively, being further configured to sending a control-plane (C-plane) message indicating the compression types, the C-plane message further indicating different RE masks, each of the RE masks indicating a type of a respective one of the subsets of REs.

28. The apparatus of claim 27, wherein the indication of the compression types is via reserved bits of the C-plane message.

29. A method for wireless communication by a distributed unit (DU), comprising:
compressing at least one reference signal (RS) in one or more first set of resource elements (REs) of a symbol and data in one or more second set of REs of the symbol, wherein the at least one RS is compressed using a first compression type and the data is compressed using a second compression type, and wherein the first compression type is different than the second compression type; and
sending, to a remote radio unit (RU), the symbol having the at least one RS in the one or more first set of REs compressed using the first compression type and the data in the one or more second set of REs compressed using the second compression type.

30. The method of claim 29, further comprising sending, to the RU, an indication of the first compression type for the at least one RS and the second compression type for the data.

* * * * *